United States Patent [19]

Aben

[11] Patent Number: 4,677,463
[45] Date of Patent: Jun. 30, 1987

[54] COLOR TELEVISION RECEIVER COMPRISING A CHROMINANCE SIGNAL PROCESSING CIRCUIT AND AN INTEGRATED CIRCUIT THEREFOR

[75] Inventor: Hermanus J. S. Aben, Eindhoven, Netherlands

[73] Assignee: U.S. Philips Corporation, New York, N.Y.

[21] Appl. No.: 755,043

[22] Filed: Jul. 15, 1985

[30] Foreign Application Priority Data

Jul. 19, 1984 [NL] Netherlands .................. 8402286

[51] Int. Cl.$^4$ ............................................. H04N 5/93
[52] U.S. Cl. ................................. 358/40; 358/21 R
[58] Field of Search ............... 358/40, 21 R, 35, 17, 358/188, 27

[56] References Cited

U.S. PATENT DOCUMENTS 4,405,937  9/1983  Kudo et al. ........................... 358/40
4,482,916  11/1984  Acampora ......................... 358/40 X Primary Examiner—James J. Groody
Assistant Examiner—Victor R. Kostah
Attorney, Agent, or Firm—Thomas A. Briody; William J. Streeter; Gregory P. Gadson

[57] ABSTRACT

By including a counting circuit, optionally followed by a sample-and-hold circuit coupled to an output of a quadrature-component demodulator in a chrominance signal processing section of a color television receiver and providing a memory circuit for a presetting value, which memory circuit is coupled to a control signal input of a chrominance carrier oscillator via a digital-to-analog converter, a fast, sufficiently accurate automatic adjusting procedure for this oscillator can be obtained, while a normally provided control loop of the oscillator is made inoperative.

7 Claims, 3 Drawing Figures

COLOR TELEVISION RECEIVER COMPRISING A CHROMINANCE SIGNAL PROCESSING CIRCUIT AND AN INTEGRATED CIRCUIT THEREFOR

BACKGROUND OF THE INVENTION

The invention relates to a color television receiver comprising a chrominance signal processing circuit with a chrominance carrier oscillator incorporated in a control loop, a control signal input of the oscillator being coupled to an output of a synchronizing signal phase detector, and an output of the oscillator being coupled to a reference signal input of the color synchronizing signal phase detector and to a reference signal input of a quadrature-component demodulator for the chrominance signal.

Such a color television receiver is generally known, for example as a NTSC or PAL receiver.

SUMMARY OF THE INVENTION

The invention has for its object to enable in such a color television receiver an automatic setting of a chrominance carrier oscillator.

According to the invention, a color television receiver of the type described in the opening paragraph is therefore characterized in that the control signal input of the chrominance carrier oscillator is further coupled to an output of a digital-to-analog converter an input combination of which is coupled to an output combination of a memory circuit for a setting value of the chrominance carrier oscillator, while an output of the quadrature-component demodulator is coupled to a counting signal input of a field-frequency resettable counting circuit a resetting signal input of which is coupled to an output for a field-frequency resetting signal of a pulse generator while an output of the counting circuit is capable of being coupled during automatic setting of the chrominance carrier oscillator to an input of the memory circuit, and the chrominance signal processing circuit further comprises a circuit for making the control loop of the chrominance carrier oscillator inoperative.

By providing the field-frequency resettable counting circuit, it is possible, in the case of an automatic adjustment, to make a frequency deviation between a chrominance carrier signal applied to the receiver and the output signal of the chrominance carrier oscillator smaller than the field frequency. It has been found that generally such an adjustment is even more accurate than the customary manual adjustment during which setting is basically effected to a frequency difference equal to a zero. Automatically an adjustment in which setting would be effected to a zero frequency difference would require measuring the positive and negative frequency differences and would moreover be too slow.

The field-frequency resettable counting circuit enables a fast adjustment, for example with a setting step frequency of approximately half the field frequency without the need for a complicated frequency difference measuring circuit.

The automatic adjustment procedure can be terminated when the counting circuit measures a frequency difference less than unity, or when the counting circuit has counted for a few times in each field period that there is a predetermined phase difference between the chrominance carrier oscillator output signal and the chrominance carrier signal applied to the receiver.

DESCRIPTION OF THE DRAWINGS

The invention will now be described in greater detail by way of example with reference to the accompanying drawing.

In the drawing.

DETAILED DESCRIPTION OF THE INVENTION

Figure 1:
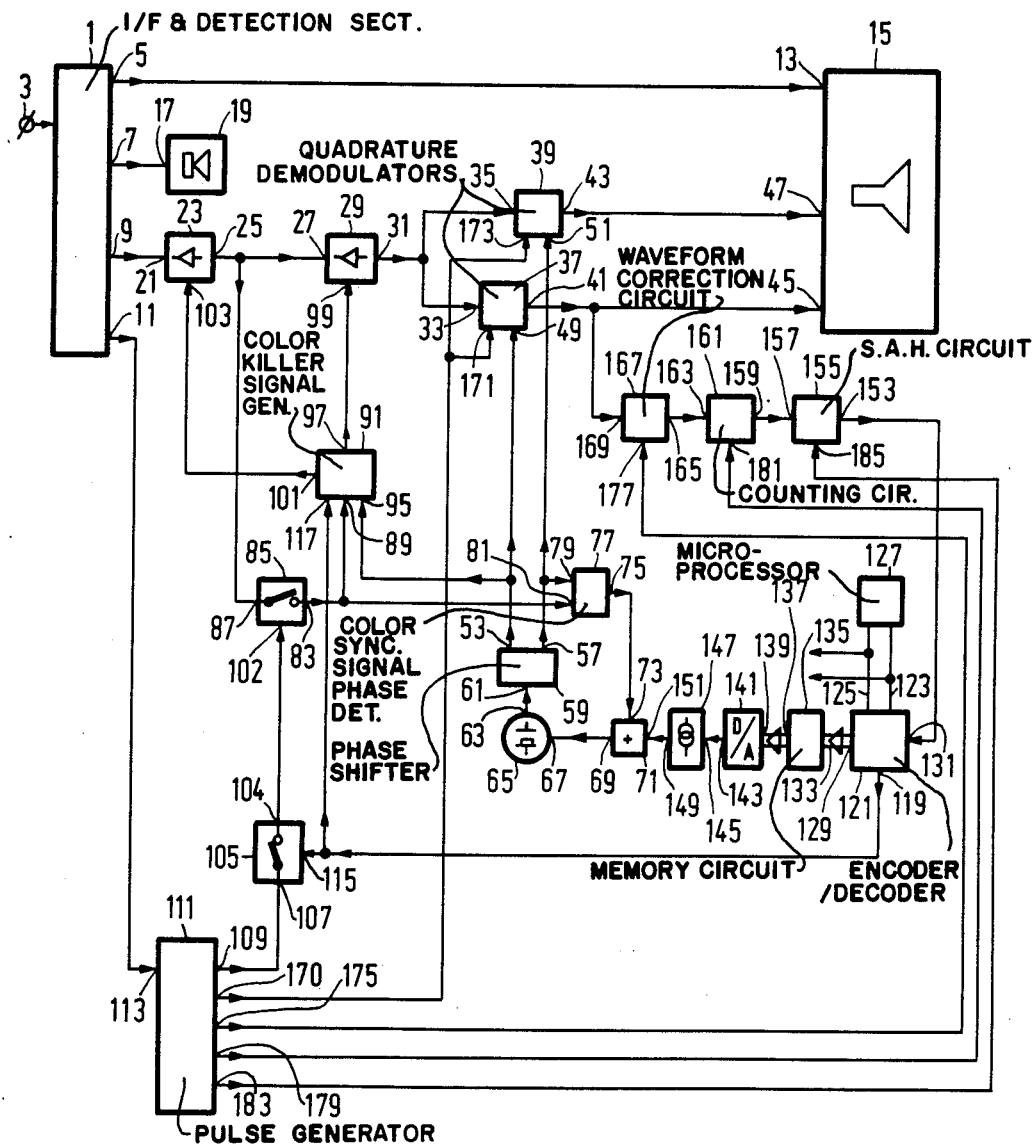
FIG. 1 illustrates by means of a concise block circuit diagram, a television receiver according to the invention.

In FIG. 1 a radio-frequency, intermediate-frequency and detection section 1 has an aerial input 3. When a color television signal is applied to this aerial input 3 a luminance signal is produced at an output 5, a sound signal at an output 7, a chrominance signal at an output 9 and a composite pulse signal synchronized with the line and field frequencies of the received television signal occurs at an output 11.

The luminance signal is conveyed from the output 5 of the radio-frequency, intermediate-frequency and detection section 1 to an input 13 of a picture display section 15.

The sound signal is conveyed from the output 7 to an input 17 of a sound reproducing section 19.

The remaining portion of the receiver, which will be described now, will be referred to as the chrominance signal processing section.

The chrominance signal supplied from the output 9 of the radio-frequency, intermediate-frequency and detection section 1 is applied to an input 21 of a first amplifier 23. An output 25 of this first amplifier is connected to an input 27 of a second amplifier 29, an output 31 of which is connected to inputs 33 and 35, respectively of respective first and second quadrature component demodulators 37 and 39. First and second color difference signals, respectively supplied from outputs 41 and 43, respectively of the respective first and second quadrature component demodulators 37 and 39 are applied to respective inputs 45 and 47 of the picture display section 15.

Reference signal inputs 49 and 51, respectively of the respective first and second quadrature component demodulators 37 and 39 are connected to outputs 53 and 57, respectively of a phase-shifting circuit 59, an input 61 of which is connected to an output 63 of a crystal-controlled chrominance carrier oscillator. A control signal input 67 of the chrominance carrier oscillator 65 is connected to an output 69 of a combining circuit 71, and input 73 of which is connected to an output 75 of a color synchronizing signal phase detector 77, a reference signal input 79 of which is connected to the output 57 of the phase-shifting circuit 59. A color synchronizing signal input 81 of the color synchronizing signal phase detector 77 is connected to an output 83 of a color synchronizing signal gate 85 an input 87 of which may, for example, be connected to the output 25 of the first amplifier 23 or to the output 31 of the second amplifier 29, provided it is suitable therefor.

The output 83 of the color synchronizing signal gate 85 is further connected to a color synchronizing signal input 89 of an amplitude control and color killer signal generating circuit 91 of which a reference signal input 95 is connected to the output 53 of the phase-shifting circuit 59, a color killer signal output 97 to, for example, a color killer signal input 99 of the second amplifier 29 and an amplitude control signal output 101 to a control signal input 103 of the first amplifier 23. It will be obvious that the color killer signal output 97 can, if so desired, be alternatively connected to the demodulators 37 and 39 or to a circuit subsequent thereto.

A gate signal input 102 of the color synchronizing signal gate 85 is connected to an output 104 of a switch 105, an input 107 of which is connected to a gate signal output 109 of a pulse generator 111 which has an input 113 connected to the output 11 of the radio-frequency, intermediate-frequency and detection section 1. On reception of a normal color television signal, the switch 105 is closed and, in response to the gate signal at the gate signal input 89 of the color synchronizing signal gate 85, this gate is closed each time a color synchronizing signal occurs. The receiver then operates in a known manner which does not require any further description.

Switching signal inputs 115 and 117, respectively of the switch 105 and of the amplitude control and color killer signal generator circuit 91 are connected to a switching signal output 119 of an encoding and decoding circuit 121 which in this case is connected to a microprocessor 127 via a two-wire bus connection 123, 125 and, in a manner not shown, to further circuits of the receiver. The two-wire bus connection 123, 125 is in this case, of the type referred to as I²C which has for its object to interconnect integrated circuits.

In addition, the encoding and decoding circuit 121 has an output combination, 129 for a digital signal combination and an input 131 for a setting signal.

The output combination 129 of the encoding and decoding circuit 121 is connected to an input combination 133 of a memory circuit 135, an output combination 137 of which is connected to an input combination 139 of a digital-to-analog converter 141. An output 143 of the digital-to-analog converter 141 is connected to an input 145 of a current source circuit 147, an output 149 of which is connected to a further input 151 of the combining circuit 71.

The setting signal input 131 of the encoding and decoding circuit 121 is connected to an output 153 of a field-frequency sample-and-hold circuit 155, an input 157 of which is connected to an output 159 of a field-frequency resettable counting circuit 161 which has a counting signal input 163 connected to an output 165 of a waveform correction circuit 167 an input 169 of which is connected to the output 41 of the first quadrature component demodulator 37.

The pulse signal generator 111 applies from an output 170, during the line and field flyback periods, a blanking signal to respective inputs 171 and 173 of the respective first and second quadrature-component demodulators 37 and 39, from an output 175 a signal which is delayed for ten microseconds relative to the blanking signal at the output 170 to an input 177 of the waveform correction circuit 167, from an output 179 a field-frequency pulse signal which coincides with the first line retrace after the field retrace to a resetting signal input 181 of the counting circuit 161, and from an output 183 a field-frequency pulse signal which coincides with the field retrace periods to an input 185 of the sample-and-hold circuit 155.

An automatic adjusting procedure of the chrominance carrier oscillator 65 proceeds as follows.

The input 3 of the receiver receives a signal comprising a constant-amplitude chrominance signal which has the desired chrominance carrier frequency and a phase which corresponds from line to line to the same color distribution along the line, preferably with a constant color.

The microprocessor 127 has a setting program which starts with resetting a sixty-four counter present in the microprocessor and applies a free-running command to the encoding and decoding circuit 121 which then supplies from its output 119 a signal which is applied to the input 115 of the switch 105 in response to which this switch is opened, so that the color synchronizing signal gate 85 remains in the open condition, which causes the control loop of the chrominance carrier oscillator 65 to be rendered inoperative, and which signal is further applied to the input 117 of the ACC and color killer signal generating circuit 91 so that no color killer signal can occur at the output 97 thereof. The position of the sixty-four counter of the microprocessor 127 is further conveyed via the encoding and decoding circuit 121 to the memory circuit 135 which produces via the digital-to-analog converter 141 and the current source 147 a setting signal value corresponding to the position of the microprocessor counter which is the zero position.

During the field period subsequent to the field period in which the procedure described in the foregoing is effected, the counting circuit 161 measures whether less than a predetermined number of times a predetermined phase difference has occurred between the input signals of the first quadrature-component demodulator 37. If not, then the output signal of the sample-and-hold circuit 155 remains high during a subsequent field period, and as this fact is conveyed via the input 131 of the encoding and decoding circuit 121 and the bus system 123, 125 to the microprocessor 127, this processor can decide during that field period that its sixty-four counter must be incremented one step as a result another step must possibly be effected during the second subsequent field period and so forth until the counting circuit 161 detects a predetermined phase difference at the inputs 33 and 49 of the first quadrature demodulator 37 less often than a predetermined number of times, as a result of which the output 153 of the sample-and-hold circuit 155 becomes low whereafter the microprocessor stores the position of its sixty-four counter in its memory and outputs the command "normal operation" which at the output 119 of the encoding and decoding circuit 121 produces a signal in response to which the switch 105 closes again and the suppression of the color killer signal by the amplitude control and colour killer signal generating circuit 91 is eliminated. Thereafter, the adjusting program of the microprocessor 127 stops.

Each time the receiver is switched on, the position of the sixty-four counter, which position was determined as described in the foregoing and stored in the microprocessor 127, is now transferred to the memory circuit 135.

As can be seen from the above, the microprocessor may take a setting step every other field, so at approximately half the field frequency, so that a very fast adjustment can take place. The step frequency need not to be further synchronized with the field frequency since the sample-and-hold circuit 155 retains the result measured by the counting circuit 161 for one field period. If the step frequency is indeed synchronized with the field frequency, then the sample-and-hold circuit 155 can be omitted if, for example, the setting step is effected in the field retrace period and the measurement in the field trace period.

If so desired, the input signal for the counting circuit 161 may, if so desired, alternatively be derived from the output signal of the second quadrature demodulator.

Although, for the sake of clarity, a color television receiver of the NTSC type has been described, the above and the subsequent descriptions also hold for a PAL receiver in which optionally, the chrominance signal for the demodulators 37, 39 is split into two components.

Figure 2:
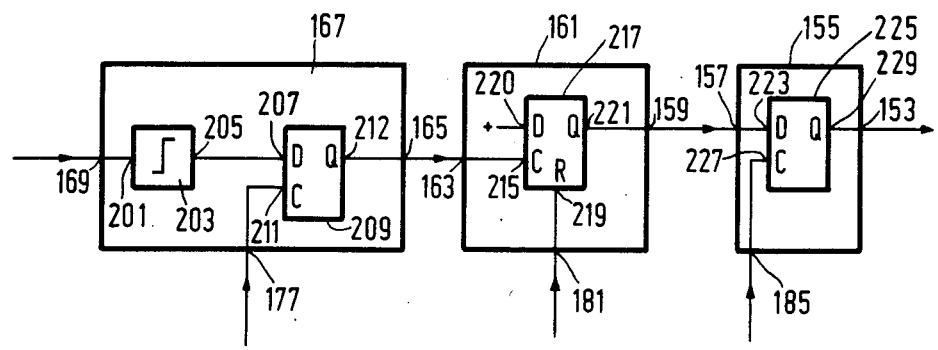
FIG. 2 illustrates by means of a block circuit diagram, a portion of the receiver of FIG. 1 comprising a possible embodiment of a counting circuit

The function of the waveform correction circuit 167, which will be described with reference to FIG. 2, is necessary to enable a simple counting circuit 161 when in the signal at the output 41 of the first quadrature component demodulator 37 blanking periods of the line frequency occur which in this case are caused by the blanking signals at the inputs 171 and 173 of the demodulators 37 and 39.

Rendering the control loop of the chrominance carrier oscillator 65 inoperative is here effected with the aid of the switch 105 as a result of which the color synchronizing signal phase detector 77 no longer receives a color synchronizing signal. If so desired, this control loop may be rendered inoperative in a different manner.

If the color kill is not effected until after the quadrature-component demodulators 37, 39 there is no need to make it inoperative during the automatic adjusting procedure.

In the described embodiment the output signal of the digital-to-analog converter 141 is first converted into a current value by the current source circuit 147 and then combined in the combining circuit 71 with the control signal received from the output 75 of the color synchronizing signal phase detector 77. It will be obvious that if so desired other suitable methods may alternatively be used for the combining operation.

In FIG. 2 components corresponding to those shown in FIG. 1 are given the same reference numerals.

The input 169 of the waveform correction circuit 167 is connected to an input 201 of a limiter circuit 203, which as a result thereof, supplies from its output 205 a signal which can only assume logic values zero or one. The output 205 of the limiter circuit 203 is connected to a D-input 207 of a D-flip-flop 209, a clock signal input 211 of which is connected to the pulse signal input 177 of the waveform correction circuit 167, and a Q-output 212 to the output 165 of the waveform correction circuit 167.

The signal at the input 177 of the waveform correction circuit 167 is delayed by ten microseconds relative to the blanking signal at the inputs 171 and 173 of the demodulators 37 and 39, and consequently with respect to the blanking periods in the signal at the input 169 of the waveform correction circuit 167. The D-flip-flop 209 now takes over the signal value at the output 205 of the limiter circuit 203, always ten microseconds after the end of a blanking period, as a result of which a signal from which the line blanking periods have been removed is supplied from the output 212 of the D-flip-flop 209.

The output 212 of the D-flip-flop 209 which acts as a line blanking eliminating circuit becomes, for example, low when cos $(W_1-W_2)t$ is negative, and high when cos $(W_1-W_2)t$ is positive at the occurrence of a positive going edge in the signal at its clock signal input 177, in which $W_1$ and $W_2$, respectively is the frequency of the signal at the inputs 33 and 49, respectively of the first quadrature-component demodulator 37.

This signal is applied from the output 212 of the flip-flop 209 to the counting signal input 163 of the counting circuit 161, which is connected to a clock signal input 215 of a D-flip-flop 217, a reset input 219 of which is connected to the rest input 181 of the counting circuit 161 and a D-input 220 to a positive voltage. This causes the flip-flop 217 to be reset at each first line retrace after the field retrace and to be set therebetween only when the signal at the counting signal input 163 of the counting circuit becomes high. So in that case the flip-flop 217 operates as a one counter.

An output 221 of the flip-flop 217 thus remains low only when in the period between two consecutive reset pulses the inputs 163 has not been in the high state, which is the case when the frequency difference between the input signals of the demodulator 37 is less than the field frequency.

The signal at the output 221 of the flip-flop 217 is applied via the output 159 of the counting circuit 161 and the input 157 of the sample-and-hold circuit 155 to a D-input 223 of a D-flip-flop 225, a clock signal input 227 of which is connected to the input 185 of the sample-and-hold circuit 155. In response thereto, at the beginning of field blanking period, the D-flip-flop 225 stores the value occurring at the output 159 of the counting circuit 161 and supplies it during a field period from its output 229, which is connected to the output 153 of the sample-and-hold circuit 155. Thus, the output 153 remains low throughout a field period, when in the preceding field period no positive-going edge had occurred at the input 163 of the counting circuit 161.

Figure 3:
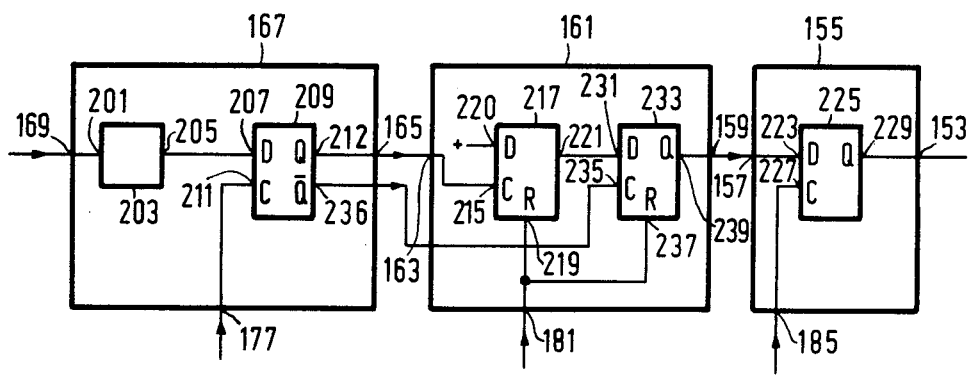
FIG. 3 illustrates by means of a block circuit diagram a portion of the receiver of FIG. 1 with a different possible embodiment of a counting circuit.

In FIG. 3 elements corresponding to those in FIGS. 1 and 2 are given the same reference numerals. The circuit of FIG. 3 differs from the circuit of FIG. 2 in the construction of the counting circuit 161.

In the counting circuit 161 the output 221 of the flip-flop 217 is now connected to a D-input 231 of a D-flip-flop 233, a clock signal input 235 of which is connected to a $\overline{Q}$-output 236 of the D-flip-flop 209, a reset input 237 is connected to the reset signal input 181 of the counting circuit, and an output 239 is connected to the output 159 of the counting circuit 161.

The output 159 of the counting circuit 161 now remains low when the frequency difference between the signals at the input 33 and 49 of the demodulator 37 is less than one and a half times the field frequency. Consequently the counting circuit 161 now operates as a one-and-a-half counter.

What is claimed is:

1. A color television receiver comprising a chrominance signal processing circuit with a chrominance carrier oscillator incorporated in a control loop, a control signal input of the loop being coupled to an output of a color synchronizing signal phase detector and an output of the oscillator being coupled to a reference signal input of the color synchronizing signal phase detector and to a reference signal input of a quadrature-component demodulator for the chrominance signal, characterized in that the control signal input of the chrominance carrier oscillator is further coupled to an output of a digital-to-analog converter an input combination of which is coupled to an output combination of a memory circuit for setting a value of the chrominance carrier oscillator, while an output of the quadrature-component demodulator is coupled to a counting signal input of a field-frequency resettable counting circuit, a reset signal input of which is coupled to an output for a field-frequency resetting signal of a pulse generator while an output of the counting circuit is capable of being coupled during automatic setting of the chrominance carrier oscillator to an input of the memory circuit and the chrominance signal processing circuit further comprises a circuit for making the control loop of the chrominance carrier oscillator inoperative.

2. A color television receiver as claimed in claim 1, characterized in that the output of the quadrature-component demodulator is coupled to the counting signal input of the counting circuit via a waveform correction circuit.

3. A color television receiver as claimed in claim 2, characterized in that the waveform correction circuit comprises a line blanking elimination circuit.

4. A color television receiver as claimed in any one of the preceding claims, characterized in that the counting circuit is a one counter.

5. A color television receiver as claimed in any one of the claims 1 to 3, characterized in that the counting circuit is a one-and-a-half counter.

6. A color television receiver as claimed in any one of the claims 1 to 3, characterized in that a sample-and-hold circuit is coupled to an output of the counting circuit.

7. An integrated chrominance signal processing circuit for a color television receiver comprising a chrominance carrier oscillator incorporated in a control loop, a control signal input of this loop being coupled to an output of a color synchronizing signal phase detector, and an output of the oscillator being coupled to a reference signal input of the color synchronizing signal phase detector and to a reference signal input of a quadrature-component demodulator for the chrominance signal, characterized in that the control signal input of the chrominance carrier oscillator is further coupled to an output of a digital-to-analog converter, an input combination of which is coupled to an output combination of a memory circuit for setting a value of the chrominance carrier oscillator while an output of the quadrature-component demodulator is coupled to a counting signal input of a field-frequency resettable counting circuit, a reset signal input of which is coupled to an output for a field-frequency resetting signal of a pulse generator while a field-frequency sample-and-hold circuit, an output of which is capable of being coupled during an automatic setting of the chrominance carrier oscillator to an input of the memory circuit, is coupled to an output of the counting circuit and the chrominance signal processing circuit further comprises a circuit for making the control loop of the chrominance carrier oscillator inoperative.

* * * * *